US012055238B2

(12) United States Patent
Waid et al.

(10) Patent No.: US 12,055,238 B2
(45) Date of Patent: Aug. 6, 2024

(54) VALVE HOUSING AND GLOBE VALVE FOR CONTROLLING A PROCESS FLUID FLOW WITH A VALVE HOUSING

(71) Applicant: SAMSON AKTIENGESELLSCHAFT, Frankfurt (DE)

(72) Inventors: Jonas Waid, Darmstadt (DE); Daniel Gränz, Eschborn (DE); Nadine Wetzstein, Frankfurt Am Main (DE); Micheal Merscher, Rödermark (DE)

(73) Assignee: Samson Aktiengesellschaft, Frankfurt (DE)

( * ) Notice: Subject to any disclaimer, the term of this patent is extended or adjusted under 35 U.S.C. 154(b) by 0 days.

(21) Appl. No.: 17/624,607

(22) PCT Filed: Jul. 3, 2020

(86) PCT No.: PCT/EP2020/068895
§ 371 (c)(1),
(2) Date: Jan. 4, 2022

(87) PCT Pub. No.: WO2021/004969
PCT Pub. Date: Jan. 14, 2021

(65) Prior Publication Data
US 2022/0260180 A1    Aug. 18, 2022

(30) Foreign Application Priority Data
Jul. 5, 2019    (DE) .................... 10 2019 118 316.2

(51) Int. Cl.
*F16K 47/08*    (2006.01)
*F16K 1/42*    (2006.01)
*F16K 27/02*    (2006.01)

(52) U.S. Cl.
CPC ............... *F16K 47/08* (2013.01); *F16K 1/42* (2013.01); *F16K 27/02* (2013.01)

(58) Field of Classification Search
CPC ............ F16K 47/08; F16K 1/42; F16K 27/02
See application file for complete search history.

(56) References Cited

U.S. PATENT DOCUMENTS 1,333,048 A * 3/1920 Webster ............... A62C 31/005
251/207
2,621,016 A    12/1952 MacGregor
(Continued)

FOREIGN PATENT DOCUMENTS

DE    1053263 B    3/1959
DE    3137687 A1    4/1983
(Continued)

OTHER PUBLICATIONS

International Search Report and the Written Opinion of the International Searching Authority dated Sep. 30, 2020, Application No. PCT/EP2020/068895 (with English-Language translation).
(Continued)

*Primary Examiner* — Matthew W Jellett
*Assistant Examiner* — Christopher D Ballman
(74) *Attorney, Agent, or Firm* — Banner & Witcoff Ltd.

(57) ABSTRACT

In a valve housing for a globe valve for controlling a process fluid flow of a process plant (e.g. a chemical plant, petrochemical plant, a power plant, or a food processing plant), a passage opening is provided that can be closed by a valve member movable translationally in a vertical direction. The valve housing may define, in the vertical direction above the passage opening, a working space for accommodating the valve member. The valve housing may define a kettle space in the vertical direction below the passage opening. The valve housing may include at least one guide blade project-
(Continued)

ing radially into the kettle space for disturbing a process fluid vortex with vertical vortex axis of rotation filling the kettle space.

19 Claims, 4 Drawing Sheets

(56) References Cited

U.S. PATENT DOCUMENTS

| | | | |
|---|---|---|---|
| 3,648,718 A | 3/1972 | Curran | |
| 3,746,049 A * | 7/1973 | O'Connor, Jr. | G05D 7/0635 137/802 |
| 3,990,475 A * | 11/1976 | Myers | F16K 47/04 137/625.3 |
| 4,022,423 A | 5/1977 | O'Connor et al. | |
| 4,825,906 A * | 5/1989 | Hartman | F16K 47/08 137/561 A |
| 5,730,416 A * | 3/1998 | Welker | F16K 47/08 251/118 |
| 5,765,814 A * | 6/1998 | Dvorak | F16K 47/04 251/118 |
| 5,931,445 A | 8/1999 | Dvorak et al. | |
| 6,003,551 A * | 12/1999 | Wears | F16K 1/06 137/625.33 |
| 6,105,614 A * | 8/2000 | Bohaychuk | F16K 47/08 251/118 |
| 6,250,330 B1 * | 6/2001 | Welker | G05D 16/02 251/118 |
| 6,439,267 B2 * | 8/2002 | Welker | F15D 1/04 251/118 |
| 6,935,370 B2 * | 8/2005 | McCarty | F16K 47/04 137/625.3 |
| 6,935,371 B2 * | 8/2005 | Stares | F16K 3/24 137/625.37 |
| 7,604,021 B2 * | 10/2009 | Ootomo | F01D 17/145 137/625.3 |
| 8,122,908 B2 * | 2/2012 | Wears | F16K 27/0263 137/625.48 |
| 8,196,892 B2 * | 6/2012 | Glaun | F16K 47/04 251/38 |
| 8,413,672 B2 * | 4/2013 | Tirrell | F16K 3/24 137/15.04 |
| 9,010,371 B2 * | 4/2015 | Folk | F16K 47/08 137/625.33 |
| 9,890,874 B2 * | 2/2018 | Bergamini | F16K 11/07 |
| 10,302,224 B2 * | 5/2019 | Kluz | F16K 47/08 |
| 10,648,588 B2 * | 5/2020 | Malavasi | F16K 1/12 |
| 10,871,243 B2 * | 12/2020 | Sander | F16K 47/08 |
| 11,209,088 B2 * | 12/2021 | Braeuer | F16K 3/26 |
| 2008/0029722 A1 * | 2/2008 | Irwin | F16K 47/023 251/45 |
| 2009/0205729 A1 * | 8/2009 | Wears | F16K 11/044 251/121 |
| 2009/0255250 A1 * | 10/2009 | Yin | F16K 3/246 60/602 |
| 2010/0300542 A1 * | 12/2010 | Haines | F16K 47/08 137/1 |
| 2014/0225020 A1 | 8/2014 | Adams | |

FOREIGN PATENT DOCUMENTS

| | | |
|---|---|---|
| EP | 2890919 B1 | 1/2017 |
| JP | S57107469 A | 7/1982 |
| WO | 2009105290 A1 | 8/2009 |
| WO | 2019060070 A1 | 3/2019 |

OTHER PUBLICATIONS

German Action dated Jun. 2, 2020, Application No. 10 2019 118 316.2.

* cited by examiner

VALVE HOUSING AND GLOBE VALVE FOR CONTROLLING A PROCESS FLUID FLOW WITH A VALVE HOUSING

CROSS REFERENCE TO RELATED APPLICATIONS

This is a U.S. National Stage Patent Application of PCT/EP2020/068895, filed on Jul. 3, 2020, which claims priority to German Patent Application No. 10 2019 118 316.2, filed Jul. 5, 2019. Each of these applications is incorporated herein by reference in its entirety.

BACKGROUND

Field

The disclosure relates to a valve housing for a globe valve and a globe valve for controlling a process fluid flow of a process plant, such as a chemical plant, for example a petrochemical plant, a power plant, a foodstuff processing plant, or the like.

Related Art

Figure 7:
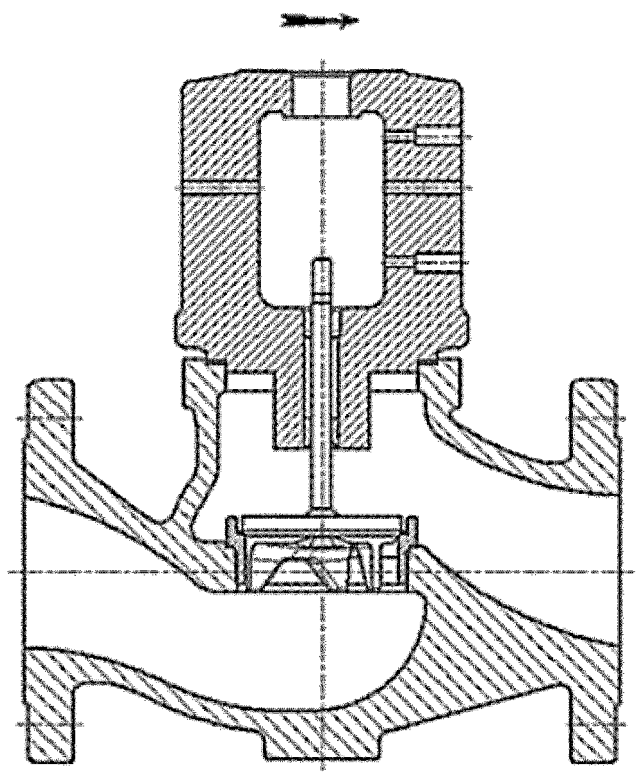
Figure 8:
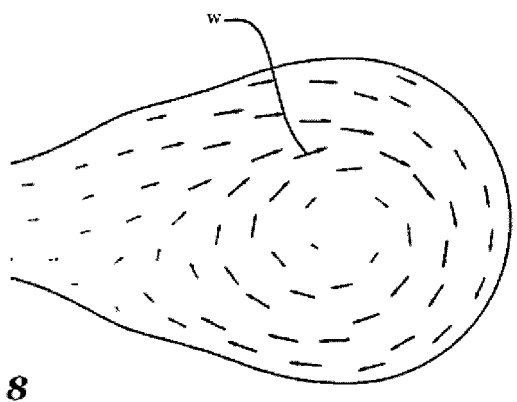

Globe valves typically have a cylindrical-tube-like inlet and a cylindrical-tube-like outlet that are coaxial with a common valve axis. A globe valve has a passage between its inlet and its outlet, which is arranged perpendicular to the valve axis. This passage is closable by a movable globe valve member. The globe valve member usually contacts directly or indirectly via an actuator lever to an actuator for actuating the valve member, the valve rod extending perpendicular to the valve axis through an access opening of the valve housing into an exterior region where the actuator is arranged. The access opening may be sealed in a process fluid-tight manner by a cover, lantern, or housing portion of the actuator. The valve member may be generally referred to as a valve plug. A conventional globe valve is shown in FIG. 7. Globe valves can be subdivided into so-called Flow-To-Open (FTO) and Flow-To-Close (FTC) valves. Flow-To-Open valves are designed for operational use of a predetermined flow direction of the process fluid corresponding to the opening direction of the valve member. Flow-To-Close valves are designed for operational use with a process fluid flow direction corresponding to the closing direction of the valve. For use and proper assembly, the predetermined operational flow direction is usually noted with a clearly visible marking on the outside of the valve. The inlet and outlet geometry of valves is characterized by the valve member arranged perpendicular to the center axis of the valve, which may be, for example, a valve plug, a valve piston in conjunction with a valve cage, or some other throttling element. The inlet usually first describes an arc curved downward in the vertical direction to a kettle space below the passage opening. The outlet describes an arc bulge upward from the passage opening and then downward. A working space in which the valve member can move is arranged in the outlet. The overall length of conventional control valves is standardized, so that only a limited, defined construction space is available for diverting the flow. The multiple deflections of the process flow between inlet and outlet result in additional flow resistance. An undesirable pressure drop or flow resistance can occur, for example, as a result of the formation of a vortex or swirl with a vertical axis of rotation in the kettle space (FIG. 8).

To counteract an increase in flow resistance due to the curved area in the inlet and frictional losses on the wall, it is common practice to continuously increase the inlet cross-section towards the throttling element. This shall serve to counteract a reduction in the flow factor (Kvs value) due to increased resistance. This is described, for example, in U.S. Pat. No. 3,648,718 A. The process fluid flow tends to separate along the path to the kettle space below the passage opening. Depending on the flow velocity and pressure difference, separation may occur sooner or later. Separation of the flow from the inlet duct wall can initiate vortexes and backflow and be responsible for high flow losses. As a result, the inlet pressure in the kettle space immediately upstream of the passage that can be closed by the valve member (this area can also be referred to as the throttling area) can deviate significantly from an assumed pressure. This may result in a subsequent pressure reduction downstream of the passage not achieving a desired outlet pressure or outlet flow.

EP 2 890 919 B1 describes a globe valve in which a knee duct section is provided extending from an inlet to the passage having a circular cross-section and a duct diameter in a straight cylindrical duct section is smaller than the diameter of the passage opening. The diameter of the cross-section shall gradually decrease from the diameter at the inlet to the duct diameter at the passage. The duct geometry described should result in a reduction of turbulent vortex flows, especially in the area below the passage opening. Nevertheless, turbulent flows also occur in places in the valve described in EP 2 890 919 B 1, which generate flow losses and cause noise. Furthermore, such a valve requires a relatively large construction space.

Another approach for a compact valve with reduced vortex formation and backflow is described in WO 2019/060070 A1. Accordingly, the fluid channel in the inlet area shall be subdivided into a multitude of smaller, parallel subchannels. For this purpose, one or more guide blades are provided in the fluid channel, which extend completely in the transverse direction from one channel wall to the opposite channel wall. In this way, the fluid flow is to be prevented from pushing unevenly into individual sections of the inlet area by absorbing torque. However, the considerably increased flow losses at the inlet and outlet of the partial channels and the increased wall friction in the large-area area of the guide blades have proven to be disadvantageous. Furthermore, the manufacturing effort of the valve described in WO 2019/060070 A1 is significantly increased due to the complicated geometry with undercuts, as is the maintenance effort, whereby increased wear at the leading edge of the guide blades in contact with the flow is particularly noticeable with corrosive fluids or particle loaded fluids.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
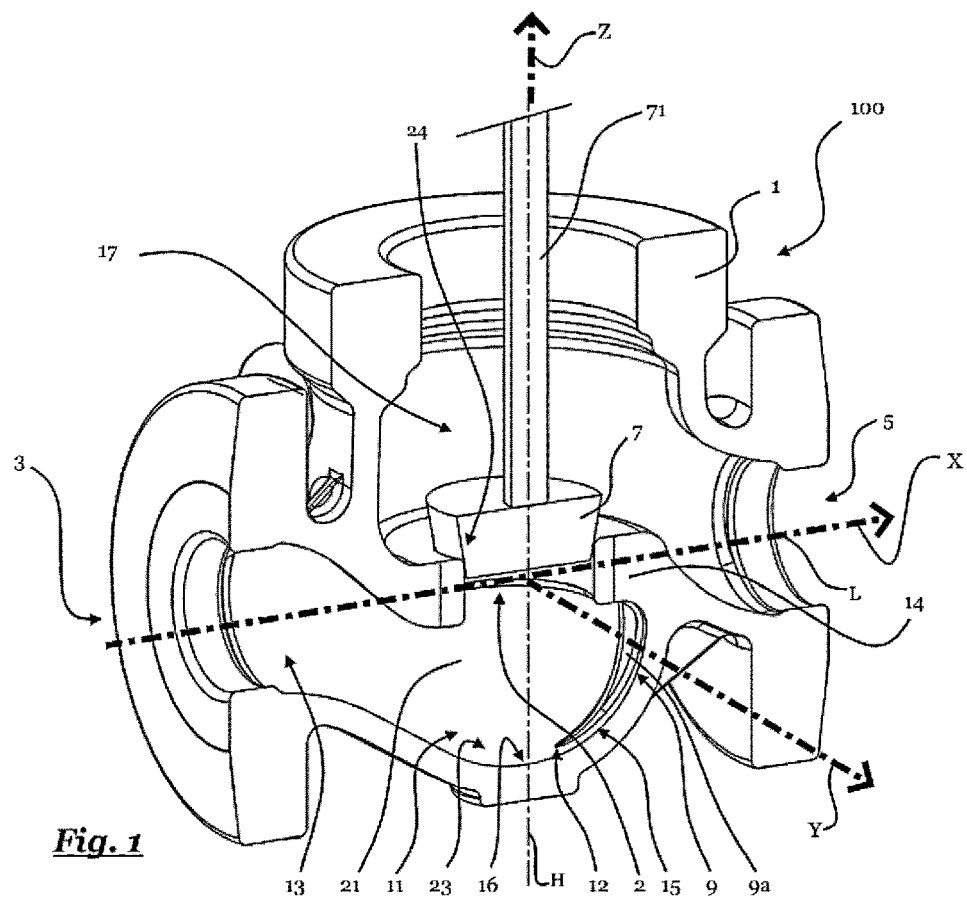
Figure 2:
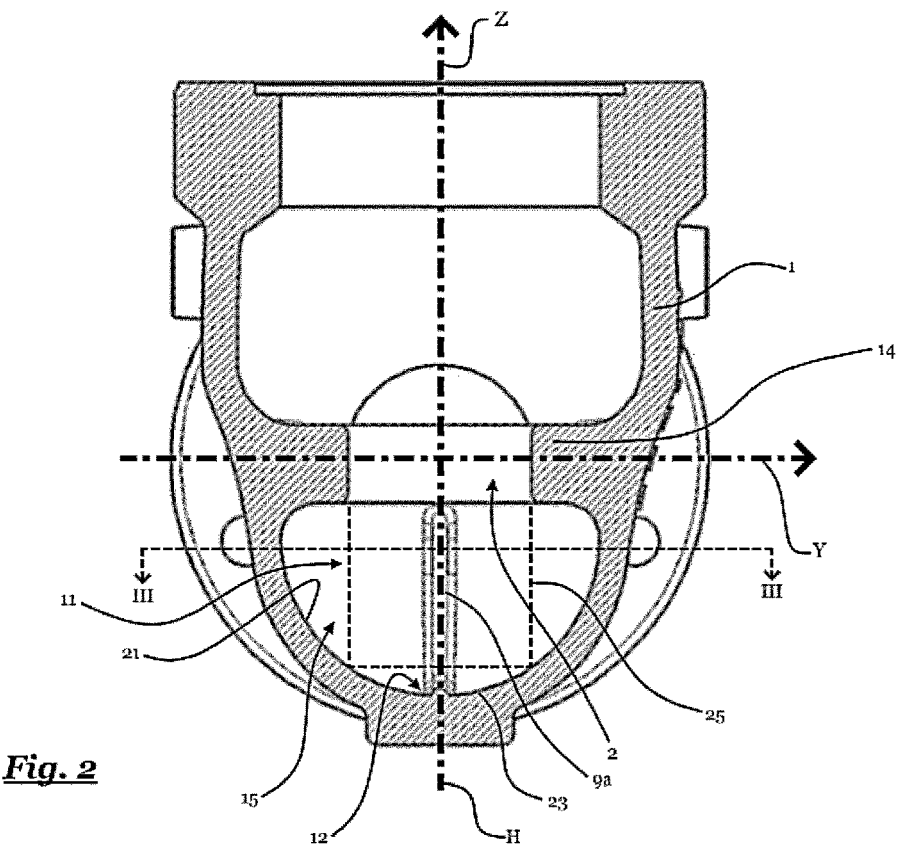
Figure 3:
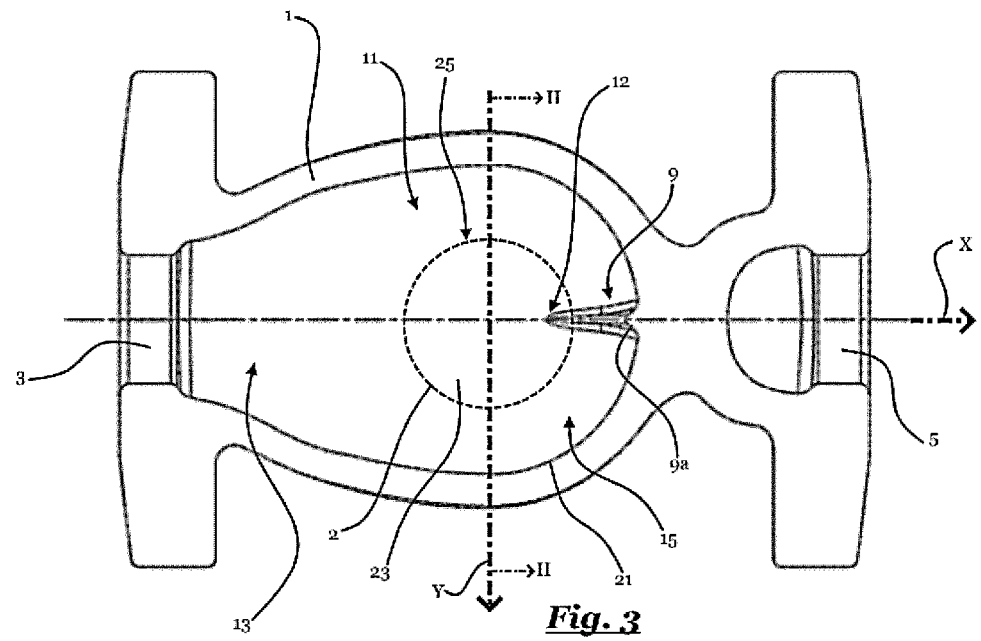
Figure 4:
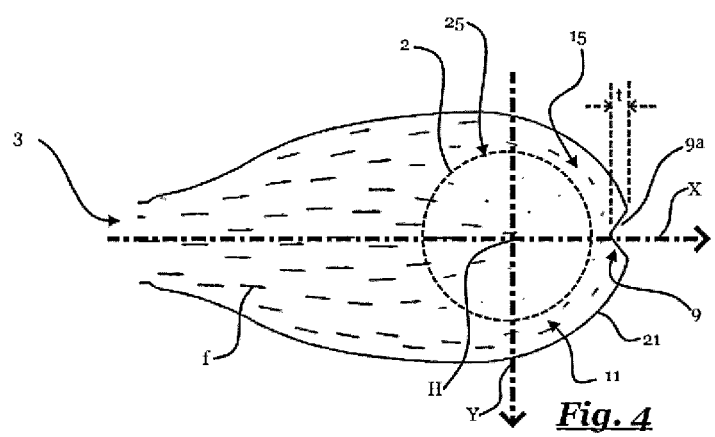
Figure 5:
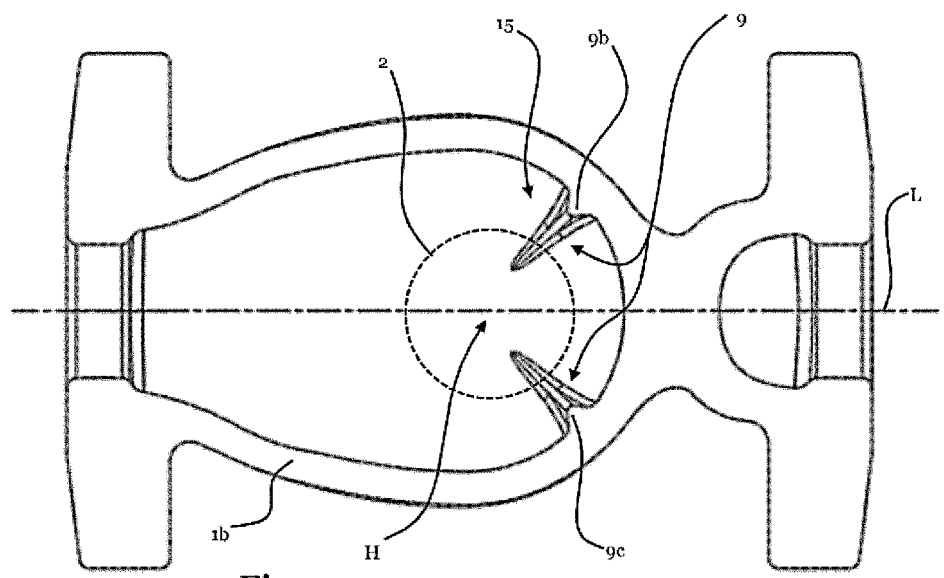
Figure 6:
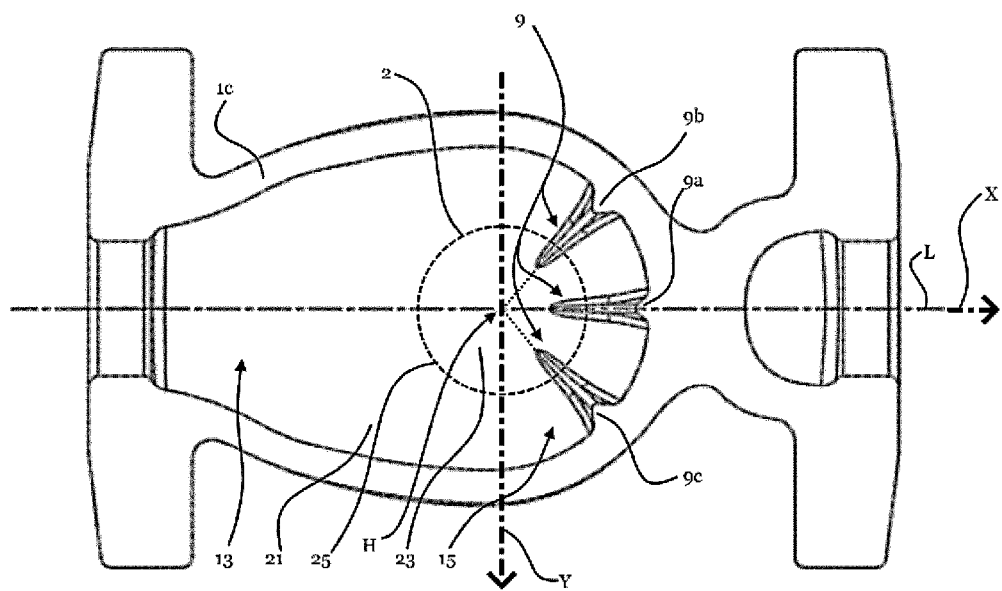

FIG. 1 a perspective partial section of a first embodiment of a globe valve according to the disclosure with a valve housing according to the disclosure;

FIG. 2 a first sectional view of the valve housing according to FIG. 1;

FIG. 3 a second sectional view of the valve housing according to the disclosure as shown in FIG. 1;

FIG. 4 a process fluid flow in the kettle space of the valve housing according to the disclosure as shown in FIG. 1;

FIG. 5 a second embodiment of a valve housing according to the disclosure;

FIG. 6 a third embodiment of a valve housing according to the disclosure;

FIG. 7 a conventional globe valve; and

FIG. 8 a swirl-like process fluid flow in the kettle space of a conventional globe valve according to FIG. 7.

The exemplary embodiments of the present disclosure will be described with reference to the accompanying drawings. Elements, features and components that are identical, functionally identical and have the same effect are—insofar as is not stated otherwise—respectively provided with the same reference character. The directional designations "vertical", "longitudinal" and "transverse" are to be understood in relation to each other, the indicated directions being mutually perpendicular to each other.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the disclosure is to overcome the disadvantages of the prior art, in particular to provide a valve which reliably avoids pressure losses in the inlet area, in particular without reducing the Kvs value of the valve, and which does not require an increase in the construction space.

Accordingly, a valve housing is provided for a globe valve for controlling a process fluid flow of a process plant, such as a chemical plant, for example a petrochemical plant, a power plant, a food processing plant, such as a brewery, or the like. The valve housing comprises a passage opening, which is closable by a valve member translationally movable in a vertical direction. Preferably, the passage opening may have a circular opening cross-section.

The valve housing defines a working space for receiving the valve member in the vertical direction above the passage opening. The valve housing can be designed in such a way that the valve member can move within the working space or chamber. In particular, the valve housing and the valve member can be matched to each other in such a way that the valve member can move exclusively within the working space. Preferably, the valve housing and the valve member are matched to each other in such a way that the valve member, in its lowest position in the vertical direction, is in engagement with an in particular annular frame, preferably a valve seat, which fully surrounds the passage opening transversely to the vertical direction. The inlet opening may have a circular opening cross-section and define a valve axis. The valve axis may correspond to a longitudinal direction and/or a horizontal direction. The globe valve member may be movable in the vertical direction transversely, in particular perpendicularly, to the valve axis. The valve housing may be constructively configured as a flow to open (FTO) valve housing or as a flow to close (FTC) valve housing. Alternatively, the valve housing can be constructively configured as an FTO and FTC valve housing.

In the vertical direction below the passage opening, the valve housing forms a kettle space or chamber. The valve housing has at least one guide blade projecting radially into the kettle space for disrupting a process fluid vortex with a vertical vortex axis of rotation filling the kettle space. The at least one guide blade prevents the formation of a swirl-like vortex in the kettle space below the passage opening.

In swirl-like vortex, relatively high velocity may occur away from the vortex axis of rotation, for example near the inner wall of the kettle, and relatively low circumferential velocity may occur near the vortex axis of rotation. The opposite applies for the pressure, which is lowest at the center. A swirling vortex may dominate the total pressure drop of the globe valve member. Without the at least one guide blade, the (partially) circular cross-section of the kettle space could be substantially completely filled with a swirl-like vortex with a vertical axis of vortex rotation, wherein the axis of vortex rotation could correspond to the vertical axis (FIG. 8). Flows of gases (e.g. ambient air) or fluids (e.g. water) can locally deviate strongly from the main flow direction as a result of vortex formation.

The guide blade can extend radially into the kettle space from the inner kettle wall of the valve housing. The kettle space may have a substantially circular cross-section transverse to the vertical axis. Below the passage opening, the kettle space may be at least sectionally wider than the passage opening. The guide blade may extend in the vertical direction from the lower end at a bottom of the kettle space to the upper end of the kettle space at a seat bridge. The upper end of the kettle space is defined by a seat bridge fully surrounding the passage opening in the radial direction. In the closed valve condition, the seat bridge forms a barrier between the kettle space and the working space. The kettle space may generally always be in fluid communication with the inlet. The working space may always be in fluid communication with the outlet. The inner wall of the kettle space may, except for the inlet opening, extend rotationally symmetrically about a vertical axis defined by the vertical direction, which may correspond to a vertical axis of vortex rotation. By having the guide blades project radially into the kettle space at the inner wall of the kettle space, a circumferential vortex flow would be disturbed by diverting the flow through the guide blades from a circumferential flow direction to a radially inward flow direction. By engagement of the guide blades into an outer circumferential flow in the kettle space of the valve housing, the valve housing according to the disclosure prevents a swirl-like vortex from forming in the kettle space, which would result in an undesirable pressure loss. The at least one guide blade may therefore also be referred to as a vortex breaker.

Viewed in the vertical direction, the kettle space has an at least partially circular or circle-section-shaped cross-section. A center of the circular or partially-circular cross-section of the kettle space may be defined by a stroke axis parallel to the vertical direction through the passage opening, in particular by the center of the passage opening. It should be understood that with respect to this stroke axis, the guide blades may project radially into the kettle space from the circumferential inner wall of the kettle space.

It should be understood that the guide blade may have a main direction of extension in the vertical direction, so as to extend sectionally or completely along the vertical height of the kettle space in the vertical direction. Relative to the main vertical extent, a radial depth in a cross-section transverse to the vertical direction from the radially outer root corresponding to the outer periphery of the kettle space inwardly to a radially projecting ridge of the guide blades may be substantially less than the main vertical extent, in particular at least five times less or at least ten times less. It should be understood that in the valve housing according to the disclosure, a guide blade does not extend transversely from one side of the kettle space to the opposite other side of the kettle space; the guide blade does not project through but into the kettle space.

According to a preferred embodiment, the valve housing further comprises an inlet opening from which a fluid inlet channel leads in a longitudinal direction to a passage opening, wherein a convex bulge of the kettle space extends in the longitudinal direction behind the passage opening in which the at least one guide blade is arranged. In this manner, it can be ensured that the process fluid flowing from the inlet opening to the passage opening can flow unimpeded through the guide blades through the passage opening. Under normal flow conditions, the guide blades of the valve housing of the disclosure do not form a significant or any measurable part of the flow resistance experienced by the process fluid flow in the valve housing. The guide blade is not longitudinally located between the inlet opening and the passage opening. Preferably, in the region from the inlet opening to the passage opening, the housing valve is longitudinally free of guide blades, in particular free of any flow obstructions. In the area within the kettle space in the longitudinal direction downstream of the passage opening, there may be a so-called dead zone with a very low flow velocity. The process fluid flow can be at rest in a dead zone in the convex bulge behind the passage opening. The process fluid in the dead zone in the region of the convex bulge may not interact or may interact only slightly with the flow of the process fluid from the inlet opening through the passage opening to the outlet opening. The longitudinal direction may be defined transversely, particularly perpendicular, to the vertical direction. The guide blade resists only those flows which move circumferentially in the kettle space relative to the vertical axis or stroke axis. With respect to the convex, (partially) spherical shape of the kettle space, the radially inwardly projecting guide blade forms a concave protrusion.

According to one embodiment, the kettle space is free of obstacles for the process fluid flow in a vertically downward direction in a particularly cylindrical region spanned by the passage opening. In particular, the region below the passage opening in the kettle space may be free of a grid structure, a cage structure and/or the like. In particular, the valve housing may be free of flow obstructions longitudinally upstream of the guide blade in the kettle space.

A cylindrical region, which is spanned by an in particular circular passage opening from the inlet opening through the passage opening to the outlet opening, can be delimited in the downward vertical direction through the contact region of the cylinder circumferential surface and the inner wall of the kettle space. Below this cylindrical area and radially adjacent to the cylinder area, in particular transversely adjacent to the cylinder area and/or longitudinally adjacent to the cylinder area, the guide blade may be arranged and extend.

According to one embodiment, the kettle space is at least sectionally wider than the passage opening in a direction transverse to the vertical direction, in particular the longitudinal direction and/or the transverse direction perpendicular to the vertical direction and/or longitudinal direction. It may be preferred that the kettle space is at least sectionally wider than the passage opening in both the longitudinal direction and the transverse direction. For example, the passage opening may define a passage opening diameter that is smaller than the largest width of the kettle space in the transverse direction. For example, the radius of the passage opening may be smaller than the radius of the kettle space starting from an axis of symmetry, in particular the vertical axis or stroke axis, of the kettle space, in the longitudinal direction and/or in the transverse direction to the inner wall of the kettle space. It may be preferred that both in the longitudinal direction and in the transverse direction, the radius of that kettle space is larger than the radius of the passage opening. The kettle space may have a substantially semi-spherical shape or a partially spherical shape (except for the region of the kettle space into which the inlet opening is formed). Preferably, the spherical radius of the kettle space may be larger in the longitudinal direction and/or in the transverse direction than the radius of the inlet opening. In such an embodiment, the kettle space extends transversely and/or longitudinally from the inlet opening beyond the passage opening. Such a design of the valve housing according to the disclosure may advantageously allow different trimmings to be provided in the globe valve, for example different valve seats and/or different valve cones. Different trimmings can also comprise differently designed and/or dimensioned seat bridges. In this way, largely identical valve bodies can be used for different globe valves, so that the manufacturing effort can be significantly reduced.

According to a preferred embodiment, the at least one guide blade is implemented as a rib or fin. The rib may be formed integrally with the valve housing. The rib may have a main extension in vertical direction, which is greater than the extension of the rib in circumferential direction or transverse direction and which is greater than the extension of the rib in longitudinal direction or radial direction. The at least one guide blade configured as a rib or fin may extend continuously along the inner wall of the kettle space in the vertical direction. Preferably, a valve housing according to the disclosure comprises no more than one rib.

According to a further development, the rib or fin has a radial cross-sectional depth that increases, in particular continuously, upwards in the vertical direction. The cross-sectional depth of the rib is defined by the distance of the rib back, which projects into the kettle space, from the rib base at the inner circumferential wall of the valve housing, which surrounds the kettle space. At the base of the kettle space, the radial cross-sectional depth of the rib may be less than a location further up in the vertical direction, for example immediately below the passage opening at the seat bridge. The rib may be greatest, especially in the region of a dead zone, near the seat bridge, in particular immediately below the seat bridge. It may be preferred that the cross-sectional depth of the rib in the vertical direction increases as the cross-section approaches the passage opening. The rib may have a rounded, parabolic or dam-shaped cross-sectional shape. With respect to the convex, (partially) spherical shape of the kettle space, the rib projecting radially inward forms a concave protrusion.

According to another further development, which can be combined with the previous one, the rib can extend from a particularly vertically lowest point of the kettle space and/or a point particularly centrally below the passage opening in vertical direction, in particular continuously upward, to a seat bridge, which forms the valve housing between the kettle space and the working space. The seat bridge may form a fluid-tight barrier between the kettle space and the working space. Preferably, the rib may extend continuously in a vertical direction through the kettle space. The vertical direction lowest starting point of the rib may be at the lowest point of the kettle space and/or at a point centrally below the passage opening. The lowest point of the kettle space may be centrally located below the passage opening. The rib may extend vertically along the entire extent of the kettle space therein. In such an embodiment, it can be ensured that swirl-like vortex flows in the kettle space with a vertical axis of vortex rotation in the entire kettle space are avoided and counteracted. According to another further development, which can be combined with the previous ones, the guide blade comprises a plurality of ribs. In particular, the guide blade may comprise exactly two or exactly three ribs.

In a preferred embodiment of the disclosure, at least one guide blade may be mirror symmetrically shaped and/or arranged, in particular relative to a mirror plane defined by the longitudinal direction and the vertical direction. For example, a guide blade may be arranged symmetrically on the plane of symmetry or mirror plane. One or more guide blades may be arranged and/or shaped in a mirror symmetrical manner relative to a mirror plane. For example, a guide blade rib may have a symmetrical cross-sectional shape relative to the mirror plane of symmetry. In an embodiment with two or more guide blades, in particular ribs, these may be arranged mirror symmetrically with respect to each other in the kettle space. In an embodiment with two guide blades, in particular ribs, these may be arranged opposite each other, in particular relative to a mirror plane defined by longitudinal direction and vertical direction, on the inner wall of the kettle space, for example in a 10 o'clock position and a 2 o'clock position, the longitudinal direction defining a 12 o'clock position. In an embodiment with two symmetrically arranged guide blades, these can be arranged relative to the stroke axis and longitudinal direction at an angle of between 10° and 90°, in particular between 30° and 60°, for example 45°. Symmetrically configured guide blades and/or a plurality of guide blades can advantageously disrupt both clockwise and counterclockwise swirl-like vortices with a vertical axis of rotation.

The disclosure also relates to a globe valve for controlling a process fluid flow of a processing plant, such as a chemical plant, for example a petrochemical plant, a power plant, a foodstuff processing plant or the like, comprising a valve housing according to one or more of the embodiments described herein and a valve member which is translationally movable in the working space in the vertical direction above the passage opening and, in a closed position which is lowest in the vertical direction, closes the passage opening in particular in a sealing manner.

The globe valve according to the disclosure can optionally be designed as an FTO-valve (flow to open) or FTC (flow to close) valve. In an FTO valve, the process fluid flow in the operationally open state flows from the inlet opening through the passage opening to the outlet opening. In an FTC valve, the process fluid flow flows from the outlet opening through the passage port to the inlet port in an operationally open condition. For simplicity, the present description will generally describe a globe valve designed as an FTO valve, although it should be clear that the description might be equally valid when the direction of flow is reversed.

By means of a valve rod arranged in vertical direction above the valve member, the globe valve member is connectable to an actuator for actuating the globe valve member. A valve member of a globe valve generally moves in a purely translatioal manner. Preferably, the valve housing and the valve member are matched to each other such that the valve member can move up and down in the vertical direction only. In an open valve condition, the process fluid can flow through the valve housing in a flow direction. For example, the valve housing may have an inlet opening upstream of the passage opening and an outlet opening downstream of the passage opening, wherein in the open valve state, the process fluid flows from the inlet opening through the passage opening to the outlet opening. The inlet opening and the outlet opening together define a valve axis, which may correspond to the longitudinal direction.

In a vertical direction lowest actuation position (or: closing position), the globe valve member closes the trough opening. When the valve member is in the lowest actuation position, the valve is in a closed state. To open the valve, the valve member can move upward in the vertical direction and assume an actuation position above the closed position. The flow channel fluidically connects the passage opening to the inlet opening. The flow cross-section of the flow channel may be spanned along a sectional plane perpendicular to a flow centerline of the flow channel and/or perpendicular to the valve axis.

A globe valve according to the disclosure is generally designated by the reference numeral 100. As essential components, the globe valve 100 comprises a valve housing 1 and a valve member 7 mounted therein. As essential components, the valve housing 1 comprises a kettle space 11 and/or a working space or chamber 17 separated therefrom and arranged thereabove in the vertical direction Z, as well as at least one guide blade 9 arranged in the kettle space 11. In a closed state of the globe valve 100, the kettle space 11 can be fluidically separated from the working space 17 by means of the valve member 7 and the seat bridge 14. In an open state of the globe valve 100, the kettle space 11 and the working space 17 can fluidically communicate with each other through the passage opening 2 in the seat bridge 14.

The globe valve 100 comprises a valve housing 1. At the inlet opening 3 and at the outlet opening 5, the housing 1 can be equipped with preferably standardized pipe flange end. Centrally in the valve housing 1, in the direction of flow between the inlet opening 3 and the outlet opening 5, is provided the passage opening 2, which can be closed by a valve member 7. The arrangement of the valve member 7 can also be designed off-center, so that the inlet area is longer. The circular passage opening 2 can be formed by a through-hole in the valve housing 1. At the through hole 2, the valve 1 may be provided with an annular valve seat 24 that occupies the through hole 2 and provides a defined closing and/or opening mating with the valve member 7. It should be understood that in another embodiment according to the disclosure, which is not shown in further detail, alternatively or additionally, for example, a hollow cylindrical valve cage as well as optionally a piston-like cage valve member may be provided. It is conceivable that the valve member 7 has a shape other than that shown, for example is conical or partially spherical.

The valve member 7 is connected to a valve rod 71 for its actuation. The valve rod 71 extends out of the housing 1 in the vertical direction Z. For mounting the valve seat 24 and for inserting the valve rod 71 and the valve member 7, the housing 2 can be equipped with a cover that can be detachably fastened in a sealing manner. The cover may be equipped with a dynamic seal for sealingly guiding the valve rod 71 out of the fluid-carrying inner region of the valve 1 and/or a lantern arranged thereabove in the vertical direction Z for mounting an actuator, such as a pneumatic or electric actuator for actuating the valve member 7 (not shown in further detail).

In the operational position shown in FIG. 1, the valve member 7 is in a closed position, in which the valve member 7 is arranged in sealing contact with the valve seat 24. The valve member 7 can be mounted translationally movable in vertical direction Z by means of the valve rod 71. A movement of the valve member 7 upward in the vertical direction Z may be referred to as an opening movement. A downward movement of the valve member 7 in the vertical direction Z may be designated as a closing movement.

The inlet opening 3 and the outlet opening 5 may be aligned plane-parallel to one another. The inlet opening 3 and/or the outlet opening 5 preferably extend in a plane which extends in vertical direction Z and transverse direction X perpendicular to a longitudinal direction and horizontal direction Y, respectively. The passage opening 2 preferably extends in a horizontal plane that extends in horizontal direction Y and transverse direction X perpendicular to the vertical direction Z. The valve member 7 is movable up and down in the vertical direction Z to open and close the globe valve 1.

In the "Flow-to-Open" globe valve 100 embodiment shown in FIGS. 1 to 4, the process fluid flow f passes from the inlet opening 3 through the passage opening 2 to the outlet opening 5. In the closed state shown in FIG. 1, the valve member 7 sealingly closes the passage opening 2 so that practically no process fluid volume flow can move from the inlet opening 3 to the outlet opening 5. As soon as the valve member 7 leaves the closed sealing position as shown in FIG. 1, a volumetric flow of the process fluid can flow from the inlet opening 3 through the kettle space 11 to the passage opening 2, and from the passage opening 2 through the working space 17 in flow direction f to the outlet opening 5. The opening movement of the valve member 7 takes place in the working space 17.

In FIG. 1, the valve member 7 is in contact engagement with the valve seat 24 so that a process fluid-tight seal is formed between the kettle space 11 connected to the inlet opening 3 on the one hand and the working space 17 connected to the outlet opening 5 on the other hand. In the closed valve state, no process fluid flow f flows from the inlet opening 3 to the outlet opening 5. When the valve member 7 is moved from the closed position shown in FIG. 1, the passage opening 2 previously closed by the valve member 7 is uncovered so that process fluid can flow from the inlet opening 3 through the passage opening 2 to the outlet opening 5.

When process fluid flow is allowed to flow from the inlet opening 3 to the outlet opening 5, the process fluid flow f first flows from the inlet opening 3 through an inlet duct 13 into the kettle space 11, wherein the direction of the process fluid flow f is characterized by a flow in the longitudinal direction X. From the kettle space 11, the process fluid flow f flows upward in vertical direction Z through the passage opening 2 into the working space 17. In the region of the kettle space 11, the process fluid is deflected from a main flow direction extending in longitudinal direction X on the inlet side into a main flow direction extending upward in vertical direction Z on the inlet side.

Some prior art globe valves attempt to prevent turbulence in the flow redirection by limiting the flow area through the valve housing to a substantially constant or decreasing cross-section from the inlet opening to the passage opening. Such globe valves are limited to one single specific design which is not readily adaptable to different user requirements. In the case of globe valves shown in FIG. 7, where the kettle space is larger than the passage opening, there is much more freedom to design valves of the same type with different trimmings, so that they can be easily adapted to different user requirements. FIG. 7 shows a conventional globe valve with a convexly bulged space below the passage opening, in which no guide blade according to the disclosure is provided. In such valves, large-volume vortices often occur when the flow is diverted, as shown in FIG. 8, which can lead to significant flow losses, which worsens controllability and can cause noise.

Also in the case of a valve housing 1, the kettle space 11 under the seat bridge 14, as can be seen in FIG. 2, may be considerably wider in the transverse direction Y as well as a longitudinal direction X, if necessary, than the passage opening 2. This would increase the risk of formation of swirl-like vortices in the kettle space 11. In the case of a swirl-like vortex with a vertical vortex axis of rotation, the process fluid in the kettle space would rotate about the vertical axis of rotation H, which corresponds to a stroke axis H through the center of a passage opening 2. In the case of a vertical vortex, process fluid would flow in the circumferential direction about this axis H along the inner wall 21. If a flow rotating about the vortex axis could now occur undisturbed along the inner wall 21 of the kettle space 11, a swirl-like vertical vortex would result.

In a valve housing 1 according to the disclosure, however, it is provided that at least one guide blade 9 is provided in the kettle space, which ensures that swirl-like process fluid vortices with a vertical vortex axis of rotation H are largely or completely prevented. The guide blade 9 prevents or interferes with the formation of a vertical vortex in the kettle space 11. A process fluid flow, which flows circumferentially about a stroke axis H along the inner wall 21 of the kettle space 11, inevitably collides with the radially inwardly projecting guide blade 9 and is deflected in the radial direction by the guide blade 9. The deflection of the process fluid at the guide blade 9 prevents a circumferential flow of the process fluid around the stroke axis H, which could cause a vertical vortex. The guide blade 9 can also be referred to as a vortex breaker. The guide blade 9 ensures a local flow of the process fluid in the radial direction. The deflection of the process fluid by means of the guide blade 9 directs the process fluid flow f towards the passage opening 2, which is arranged radially centrally on the upper side of the kettle space 11, where the process fluid flows off upwardly in the vertical direction Z.

The guide blade 9 may be formed in the manner of an elongated rib 9a or fin inside the kettle space. The rib 9a extends in the vertical direction Z along the entire vertical height of the kettle space 11. The rib 9a begins at the bottom 23 of the kettle space 11 and extends continuously therefrom along the circumferential inner wall 21 of the kettle space 11 to the seat bridge 14. The cross-sectional depth t of the rib 9a is greatest near the seat bridge 14. In particular, the cross-sectional depth t of the rib 9a may be greatest there, whereby the width of the kettle space 11 in the transverse direction Y is greatest.

In the embodiment shown in FIGS. 1-3, the lower foot of the rib in the vertical direction Z starts at a position 12 in the vertical direction Z below the passage opening. The position 12 may in particular be selected centrally below the passage opening 2. According to an embodiment not shown in more detail, the vertically lower start of the guide blade 9 may be arranged at the lowest point 16 of the kettle space 11.

In the area spanned by the passage opening 2 as a base area, which may be defined as a cylinder shaped area or cylindrical area 25, the valve housing 1 is free of flow obstructions such as rods, cages, deflectors or the like. The cylindrical region 25 ends in the vertical direction Z below the passage opening 2 where the circumferential surface of the cylinder, defined by the diameter of the passage opening 2, meets the bottom 23 or the inside 21 of the kettle space 11. The base of the cylinder area 25 does not extend fully to the bottom 23 of the lowest position 12 of the kettle space 11. The cylinder area 25 may define the boundary of the lateral inner walls 21 and the vertically lower bottom 23 of the kettle space 11. In the embodiment of the valve housing 1 according to the disclosure shown in FIG. 2, a foot portion of the guide blade 9 is arranged vertically below the cylinder area 25 at the bottom 23 of the kettle space 11.

Relative to the cylinder area 25, the kettle space 11 forms a convex bulge on both sides in the transverse direction Y. In the longitudinal direction Y opposite the inlet opening 3, the kettle space 11 also forms a convex bulge 15 relative to the cylindrical region 25. In this convex bulge 15, the guide blade 9 is largely or completely arranged. This has the advantage that, with an optimum flow of the process fluid from the inlet opening 3 through the passage opening 2 to the outlet opening 5, no flow or only a slight flow of the process fluid flows in the region of the convex bulge 15, so that the guide blade 9 mounted there forms virtually no flow resistance for the predominant part of the process fluid flow f. On the other hand, the guide blade is a considerable flow resistance for vortex flows with a vertical vortex axis of rotation running circumferentially in the kettle space 11.

In the case of an optimum process fluid flow f through the valve housing 1, a so-called dead zone can form in the region of the convex bulge 15, in which process fluid rests or rolls about an axis extending horizontally in the transverse direction. Such a roll movement generates almost no pressure loss in the area of the passage opening.

In FIGS. 3 and 4, the position of the passage opening 2 is indicated by a dashed circular line. It can be seen clearly that the guide blade 9 formed as a rib 9a is provided in the longitudinal direction X relative to the passage opening 2 on the inner wall 21 of the kettle space formed opposite inlet opening 3.

The guide blade 9 is formed as a symmetrical rib 9a at the center line of the valve housing 1 relative to the mirror plane spanned in the longitudinal direction X and vertical direction Z. Thanks to the symmetrical formation, vertical vortices are equally disturbed regardless of the direction of their rotation. It should be understood that a symmetrical arrangement or a symmetrical shaping can be chosen optionally, or a combination of symmetrical arrangement and symmetrical shaping.

The radial depth t of the rib 9a formed guide blade 9 a starts on the outside at the inner wall 21 of the kettle space 11. From there, the rib 9a rises in the radial direction towards the stroke axis H of the valve housing 1. The rib 9a may extend in the radial direction through the complete area of convex bulging 15 to near the circumferential envelope curve of cylinder area 25 below passage opening 2 (not shown). It should be understood that the guide blade 9 is not intended to extend radially into the cylinder area 25. The radial depth t may be less than one-half, less than one-quarter, or even less than one-tenth of the radial width of the kettle space 11 at the base of the rib 9a relative to the axis H, and in particular this may apply predominantly (i.e., more than 50%) or entirely along the vertical extent of the rib 9a. Surprisingly, it has been shown that even simple-to-manufacture valve housings 1 with relatively small vertically-extended guide blade 9 produce a noticeable disturbance of swirl-like vortices w with a vertical axis of rotation.

FIGS. 5 and 6 show alternative embodiments of valve housings 1b and 1c, respectively, according to the disclosure, which differ from valve housing 1 essentially only in the number of guide blades 9. With the exception of their number and position, the same applies to the guide blades 9 formed as ribs 9b and 9c offset in the transverse direction Y relative to the valve axis L of the valve housing 1b or 1c as to the central guide blade rib 9a described above.

Relative to the stroke axis H, the ribs 9b or rather 9c are preferably arranged mirror-symmetrically offset by about 45° relative to the valve axis L on both sides on the inner side or inner wall 21 of the valve housing 1b or 1c. Such ribs 9b or 9c projecting in the longitudinal direction X in the direction of the inlet opening 3 can have an early effect on the formation of undesirable vortex-disturbing influence. As described with respect to the central rib 9a, it is not essential for a sufficient disturbing effect, although it is preferred, that the offset ribs 9b and 9c are arranged symmetrically with respect to each other with respect to the mirror plane passing through the valve axis L and, moreover, are each mirror-symmetrically shaped about their own symmetry shape axis.

The features disclosed in the foregoing description, the figures and the claims may be significant, both individually and in any combination, for the realization of the disclosure in the various embodiments.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1, 1b, 1c valve housing
2 passage opening
3 inlet opening
5 outlet opening
7 valve member
9 guide blade
9a, 9b, 9c rib
11 kettle space
12 central position
13 inlet duct
14 seat bridge
15 bulge
16 lowest point
17 working space
21 inner wall
23 bottom
24 valve seat
25 cylinder area
71 valve rod
100 globe valve
f process fluid flow
t depth
w vortex
H stroke axis/axis of rotation
L valve axis
X longitudinal direction
Y transverse direction
Z vertical direction

The invention claimed is:

1. A valve housing for a globe valve for controlling a process fluid flow of a process plant, comprising:
a passage opening configured to be closable by a valve member that is translationally movable in a vertical direction, the valve housing defining a working space configured to receive the valve member in the vertical direction above the passage opening;
a kettle space formed in the vertical direction completely below the passage opening; and
at least one guide blade projecting radially into the kettle space and configured to disturb a process fluid vortex occupying the kettle space having a vertical vortex axis of rotation, wherein a seat bridge forms the valve housing between the kettle space and the working space, and forms a barrier between the kettle space and the working space in a closed valve state.

2. The valve housing according to claim 1, further comprising: an inlet opening from which a fluid inlet duct leads in a longitudinal direction to the passage opening, wherein a convex bulge of the kettle space extends in the longitudinal direction behind the passage opening in which the at least one guide blade is arranged.

3. The valve housing according to claim 2, wherein the kettle space is free of obstacles for the process fluid flow in a vertical downward direction in a cylindrical region spanned by the passage opening.

4. The valve housing according to claim 1, wherein the kettle space is free of obstacles for the process fluid flow in a vertical downward direction in a cylindrical region spanned by the passage opening.

5. The valve housing according to claim 1, wherein the kettle space is at least sectionally wider than the passage opening.

6. The valve housing according to claim 5, wherein the kettle space is at least sectionally wider than the passage opening:
in a direction transverse to the vertical direction;
in the longitudinal direction; and/or
in the transverse direction perpendicular to the vertical direction and/or the longitudinal direction.

7. The valve housing according to claim 1, wherein the at least one guide blade is a rib.

8. The valve housing according to claim 7, wherein the rib comprises a radial cross-sectional depth continuously increasing upwards in the vertical direction.

9. The valve housing according to claim 8, wherein the rib extends from a lowest position of the kettle space and/or from a position centrally below the passage opening continuously upwards in the vertical direction to the seat bridge.

10. The valve housing according to claim 7, wherein the rib extends from a lowest position of the kettle space and/or from a position centrally below the passage opening continuously upwards in the vertical direction to the seat bridge.

11. The valve housing according to claim 7, wherein one guide blade of the at least one guide blade includes a plurality of ribs.

12. The valve housing according to claim 7, wherein one guide blade of the at least one guide blade includes exactly 2 or 3 ribs.

13. The valve housing according to claim 1, wherein the at least one guide blade is mirror-symmetrically shaped.

14. A globe valve for controlling a process fluid flow of a process plant, comprising:
a valve housing according to claim 1, and
a valve member translationally movable within the working space in the vertical direction above the passage opening, wherein the valve member is configured to seal the passage opening in a lowest closing position in the vertical direction.

15. The valve housing according to claim 1, wherein the process plant includes a chemical plant, a petrochemical plant, a power plant, or a foodstuff processing plant.

16. The valve housing according to claim 1, wherein the at least one guide blade is arranged mirror-symmetrically.

17. The valve housing according to claim 1, wherein the seat bridge is integrally formed with a valve body of the valve housing such that the valve body and seat bridge collectively form the valve housing as a one-piece construction.

18. A valve housing for a globe valve for controlling a process fluid flow of a process plant, comprising:
a passage opening configured to be closable by a valve member that is translationally movable in a vertical direction, the valve housing defining a working space configured to receive the valve member in the vertical direction above the passage opening;
a kettle space formed in the vertical direction below the passage opening; and
at least one guide blade projecting radially into the kettle space and configured to disturb a process fluid vortex occupying the kettle space having a vertical vortex axis of rotation, wherein a seat bridge forms the valve housing between the kettle space and the working space, and fluidically separates the kettle space and the working space in a closed valve state.

19. The valve housing according to claim 18, wherein the kettle space is formed in the vertical direction completely below the passage opening.

* * * * *